(No Model.)
B. A. BACKMAN.
KITCHEN UTENSIL.
No. 497,162. Patented May 9, 1893.
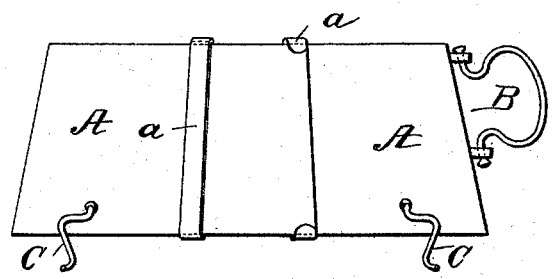
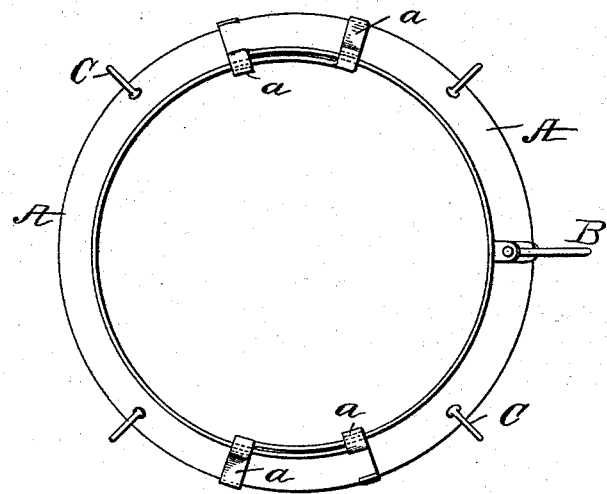
WITNESSES:
H. Walker
C. Sedgwick
INVENTOR
B. A. Backman
BY Munn & Co
ATTORNEYS.

UNITED STATES PATENT OFFICE.

BERTHA A. BACKMAN, OF MALDEN, MASSACHUSETTS.

KITCHEN UTENSIL.

SPECIFICATION forming part of Letters Patent No. 497,162, dated May 9, 1893.

Application filed November 30, 1892. Serial No. 453,596. (No model.)

*To all whom it may concern:*

Be it known that I, BERTHA A. BACKMAN, of Malden, in the county of Middlesex and State of Massachusetts, have invented a new and useful Improvement in Kitchen Utensils, of which the following is a full, clear, and exact description.

This invention has mainly for its object the production of a shield for attachment to frying pans to prevent spattering of grease on the stove, or on the other articles thereon, in frying.

The invention consists in the construction and arrangement of parts hereinafter described and claimed.

Reference is to be had to the accompanying drawings forming a part of this specification, in which similar letters of reference indicate corresponding parts in both the figures.

Figure 1 is a side elevation of a shield constructed in accordance with my invention; and Fig. 2 is a plan view thereof.

The shield is made in the form of a truncated cone, and is composed of the two half sections A, A, to one of which any suitable bail or handle B is affixed. To each of the sections A, there is secured at the lower, broader ends, legs C, the same in the instance shown, being formed of wire, soldered or otherwise secured to the shield at the outside, and bent outward and then inward, thus adapting the legs to the rim of a pan.

At the meeting ends each section A is formed with a band $a$ which embraces the opposite section and forms a guide therefor, the arrangement effecting a sliding connection, and there being sufficient friction to maintain the sections in the adjusted position without adventitious fastening devices. It will be seen that when thus formed in two sections, each adjustable at each end relatively to the other, a wide range of adjustment is provided for, notwithstanding the provision of a proper number of legs C. Thus a most serviceable utensil for its purpose is provided, easily manipulated, and capable of ready and varied adjustment. The utensil also serves for supporting and heating a plate or dish, the utensil in this case being inverted and resting on the stove. Further, it may be placed on a pot or the like in boiling meat or vegetables, and will prevent the water from boiling over, as the ebullition may raise the water in the shield without any escaping between the same and the pot or other vessel.

Having thus fully described my invention, I claim as new and desire to secure by Letters Patent—

As a new article of manufacture, the herein described kitchen utensil, the same being of truncated cone shape, provided with a series of legs at the lower edge, and formed in two sections, each of which is provided at each end with a guide that embraces and forms a sliding connection with the opposite section, said guides serving also to retain the sections in the adjusted position, substantially as described.

BERTHA A. BACKMAN.

Witnesses:
W. ARTHUR WAGNER,
J. SYDNEY HITCHINS.